United States Patent
Oh et al.

(10) Patent No.: US 11,549,202 B2
(45) Date of Patent: Jan. 10, 2023

(54) METHOD FOR PRODUCING CARBON NANOTUBE FIBER AGGREGATE HAVING IMPROVED LEVEL OF ALIGNMENT

(71) Applicant: LG CHEM, LTD., Seoul (KR)

(72) Inventors: Eugene Oh, Daejeon (KR); Juhan Kim, Daejeon (KR); Ji Eun Kim, Daejeon (KR); Won Jae Lee, Daejeon (KR); Hyunjung Cho, Namyangju-si (KR); Kun-Hong Lee, Pohang-si (KR)

(73) Assignee: POSTECH ACADEMY-INDUSTRY FOUNDATION, Gyeongsangbuk-do (KR)

( * ) Notice: Subject to any disclaimer, the term of this patent is extended or adjusted under 35 U.S.C. 154(b) by 785 days.

(21) Appl. No.: 16/340,887

(22) PCT Filed: Oct. 27, 2017

(86) PCT No.: PCT/KR2017/011976
§ 371 (c)(1),
(2) Date: Apr. 10, 2019

(87) PCT Pub. No.: WO2018/080223
PCT Pub. Date: May 3, 2018

(65) Prior Publication Data
US 2019/0233976 A1    Aug. 1, 2019

(30) Foreign Application Priority Data
Oct. 31, 2016    (KR) .................. 10-2016-0143313

(51) Int. Cl.
*D01F 9/12*    (2006.01)
*C01B 32/168*    (2017.01)
(Continued)

(52) U.S. Cl.
CPC ............... *D01F 9/12* (2013.01); *B82Y 40/00* (2013.01); *C01B 32/162* (2017.08);
(Continued)

(58) Field of Classification Search
CPC . D01F 9/12; D01F 9/127; B82Y 40/00; C01B 32/162; C01B 32/168;
(Continued)

(56) References Cited

U.S. PATENT DOCUMENTS 8,202,505 B2 *   6/2012   Hata ..................... B82Y 30/00
                                                              423/447.2
9,556,542 B2     1/2017   Oh et al.
(Continued)

FOREIGN PATENT DOCUMENTS

CN    101284423 A    10/2008
CN    101967699 A    2/2011
(Continued)

OTHER PUBLICATIONS

Wang, J. N., et al. "High-strength carbon nanotube fibre-like ribbon with high ductility and high electrical conductivity." Nature communications 5.1 (2014): 1-8.*
(Continued)

*Primary Examiner* — Richard M Rump
(74) *Attorney, Agent, or Firm* — Dentons US LLP

(57) ABSTRACT

The present invention relates to a method for producing a carbon nanotube fiber aggregate and provides a carbon nanotube fiber aggregate having an improved level of alignment through ultrasonic wave application and low speed recovery.

9 Claims, 3 Drawing Sheets

(51) Int. Cl.

| | | |
|---|---|---|
| *C01B 32/162* | (2017.01) | |
| *D06M 10/02* | (2006.01) | |
| *D01F 9/127* | (2006.01) | |
| *B82Y 40/00* | (2011.01) | |
| *D02G 3/16* | (2006.01) | |
| *D02G 3/44* | (2006.01) | |
| *D01D 1/06* | (2006.01) | |
| *D01D 10/00* | (2006.01) | |

(52) U.S. Cl.
CPC ............ *C01B 32/168* (2017.08); *D01D 1/06* (2013.01); *D01D 10/00* (2013.01); *D01F 9/127* (2013.01); *D02G 3/16* (2013.01); *D02G 3/44* (2013.01); *D06M 10/02* (2013.01); *C01B 2202/08* (2013.01); *C01P 2002/82* (2013.01); *C01P 2004/16* (2013.01)

(58) Field of Classification Search
CPC ...... C01B 2202/08; D01D 1/06; D01D 10/00; D01D 1/065; D02G 3/16; D02G 3/44; D02G 3/441; D06M 10/02; D06M 2101/40; C01P 2002/82; C01P 2004/16; D10B 2101/122; D10B 2401/063; D10B 2401/16
See application file for complete search history.

(56) References Cited

U.S. PATENT DOCUMENTS

| | | | |
|---|---|---|---|
| 9,944,529 | B2 | 4/2018 | Zhang et al. |
| 10,065,862 | B2 | 9/2018 | Jeong et al. |
| 2013/0028830 | A1 | 1/2013 | Pick et al. |
| 2014/0039309 | A1 | 2/2014 | Harris et al. |
| 2014/0046291 | A1 | 2/2014 | Harris et al. |
| 2014/0363669 | A1 | 12/2014 | Otto et al. |
| 2015/0110704 | A1 | 4/2015 | Jeong et al. |
| 2016/0083257 | A1 | 3/2016 | Ueyama et al. |
| 2016/0135687 | A1 | 5/2016 | Harris et al. |
| 2017/0292208 | A1 | 10/2017 | Yoon et al. |
| 2018/0305211 | A1 | 10/2018 | Sundaram et al. |
| 2019/0210878 | A1 | 7/2019 | Mukai et al. |

FOREIGN PATENT DOCUMENTS

| | | | |
|---|---|---|---|
| CN | 103827364 | A | 5/2014 |
| CN | 104641028 | A | 5/2015 |
| CN | 105189840 | A | 12/2015 |
| CN | 105734871 | A | 7/2016 |
| EP | 3214212 | A1 | 7/2006 |
| JP | 2003-054921 | A | 2/2003 |
| JP | 2005-502792 | A | 1/2005 |
| JP | 4972833 | B2 | 7/2012 |
| JP | 2014-503448 | A | 2/2014 |
| JP | 2015-533760 | A | 11/2015 |
| KR | 10-2008-0009043 | A | 1/2008 |
| KR | 10-2006-0077982 | A | 7/2012 |
| KR | 10-2013-0134102 | A | 12/2013 |
| KR | 10-2014-0059843 | A | 5/2014 |
| KR | 1020140147004 | A | 12/2014 |
| KR | 10-2016-0049998 | A | 5/2016 |
| KR | 10-0645308 | B1 | 11/2016 |
| WO | 2003/004740 | A1 | 1/2003 |
| WO | 2003/004741 | A1 | 1/2003 |
| WO | 2006/137893 | A2 | 12/2006 |
| WO | 2007/015710 | A2 | 2/2007 |
| WO | 2012/059716 | A1 | 5/2012 |
| WO | 2014/185497 | A1 | 11/2014 |

OTHER PUBLICATIONS

Dassios, Konstantinos G., et al. "Optimization of sonication parameters for homogeneous surfactant-assisted dispersion of multiwalled carbon nanotubes in aqueous solutions." The Journal of Physical Chemistry C 119.13 (2015): 7506-7516.*

Sundaram, Rajyashree M., and Alan H. Windle. "One-step purification of direct-spun CNT fibers by post-production sonication." Materials & Design 126 (2017): 85-90.*

Sun et al., "Fabrication of Microscale Carbon Nanotube Fibers", Journal of Nanomaterials, vol. 2012, Article ID 506209, 10 pages.

Yang et al. "Synthesizing a Well-Aligned Carbon Nanotube Forest With High Quality via the Nebulized Spray Pyrolysis Method by Optimizing Ultrasonic Frequency", Nanovol. 06, No. 04, pp. 343-348 (2011) Brief Reports.

Krzysztof Koziol et al. "High-Performance Carbon Nanotube Fiber", Dec. 21, 2007 vol. 318 Science.

Jung et al., "Controlling the crystalline quality of carbon nanotubes with processing parameters from chemical vapor deposition synthesis", Chemical Engineering Journal, vol. 228, Jul. 15, 2013, pp. 1050-1056.

* cited by examiner

[Fig. 1]
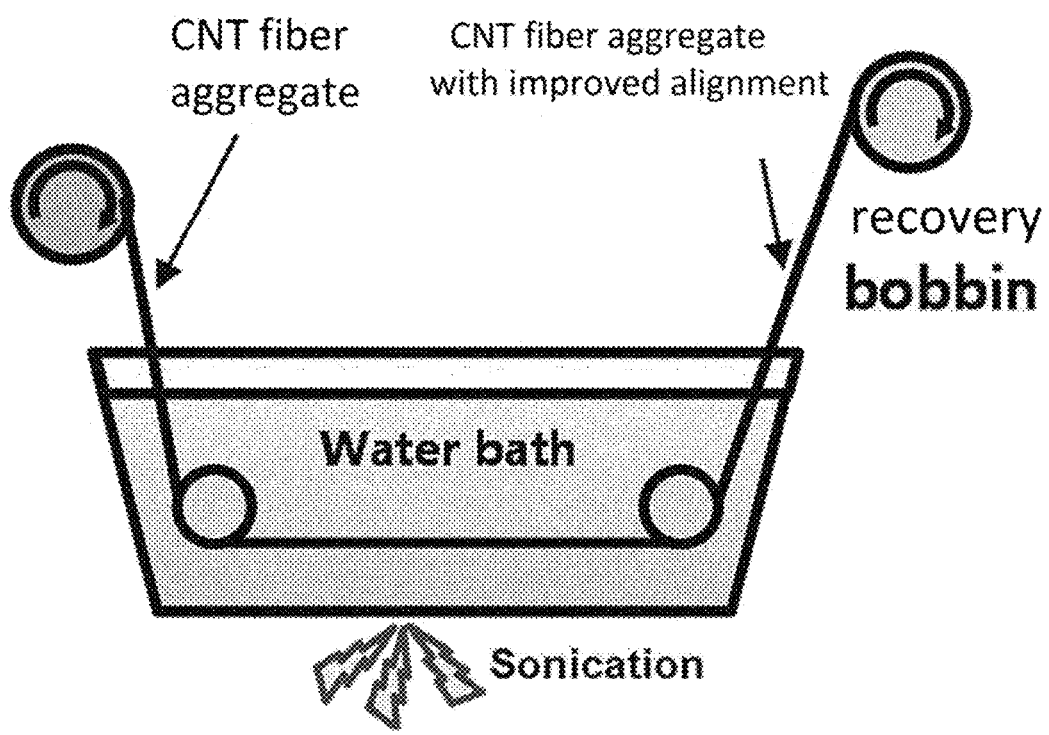

[Fig. 2]
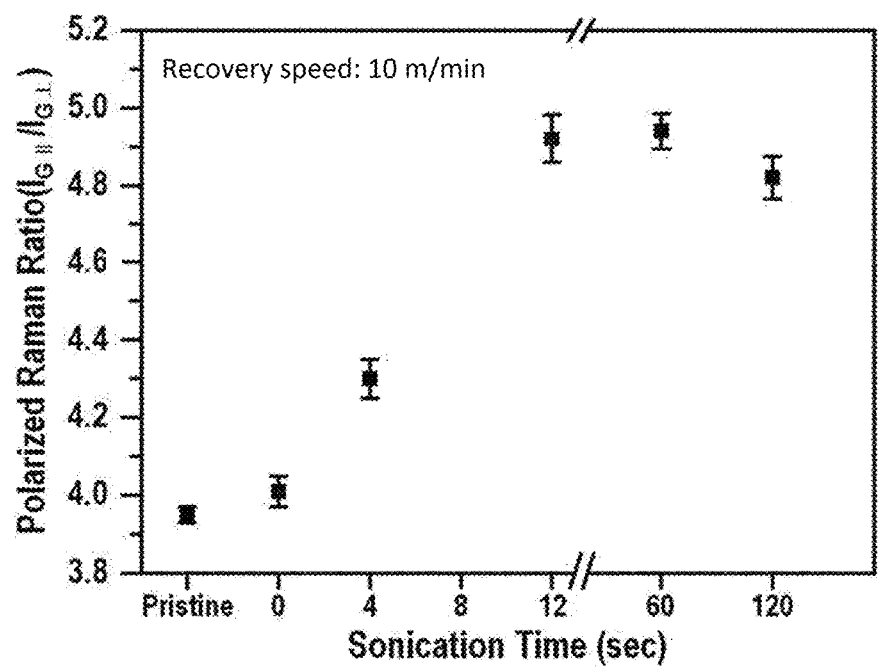

[Fig. 3]
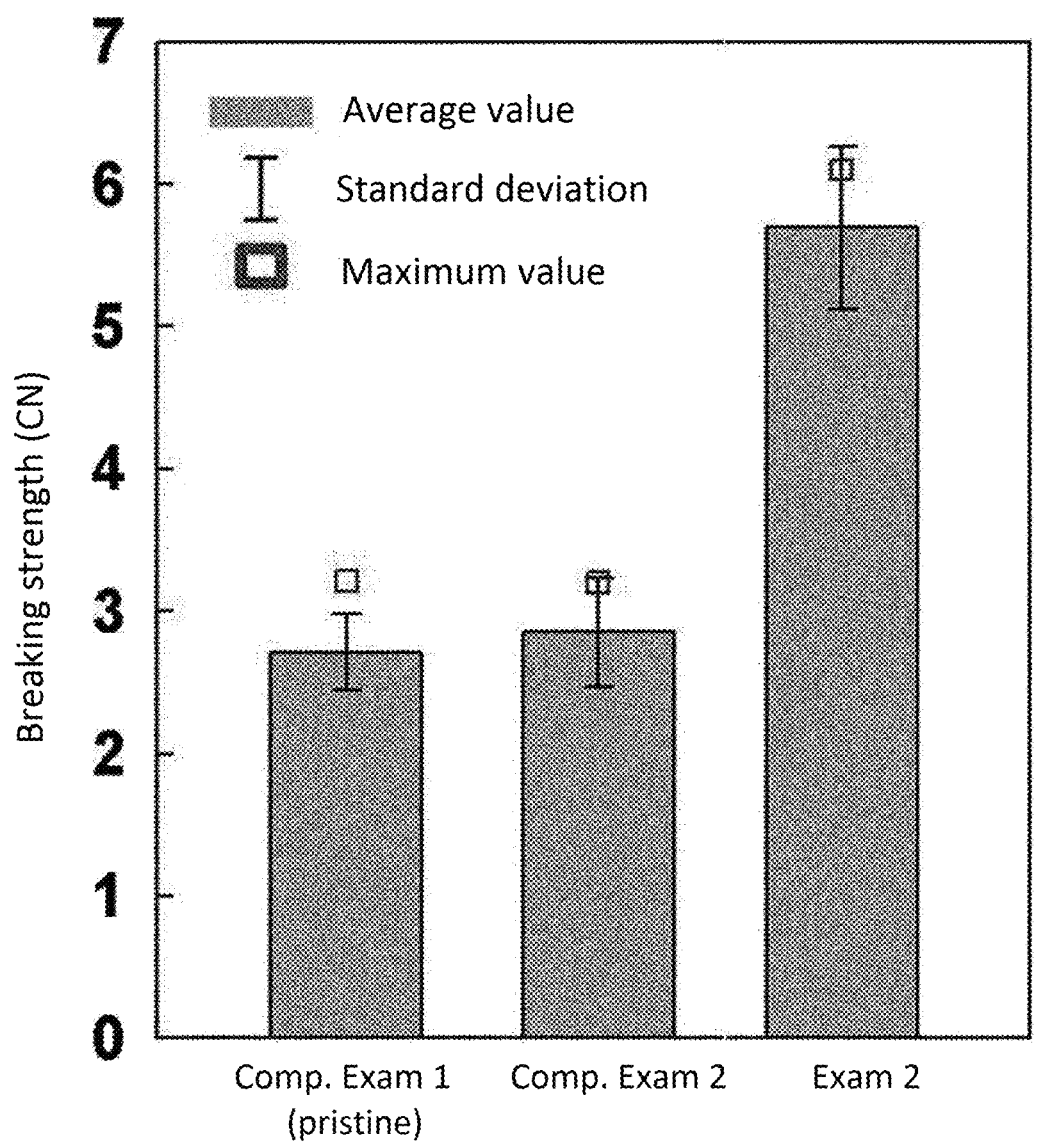

METHOD FOR PRODUCING CARBON NANOTUBE FIBER AGGREGATE HAVING IMPROVED LEVEL OF ALIGNMENT

This application claims is a National Phase Entry pursuant to 35 U.S.C. § 371 of International Application No. PCT/KR2017/011976, filed Oct. 27, 2017, and claims the benefit of priority to Korean Patent Application No. 10-2016-0143313, filed on Oct. 31, 2016, the entire disclosure of which is incorporated herein by reference.

FIELD

The present invention relates to a method for manufacturing a carbon nanotube fiber aggregate with improved fiber alignment.

BACKGROUND

Carbon nanotubes (CNTs) are a kind of allotrope of carbon, which have a diameter of several to several tens of nanometers and a length of several hundred micrometers to several millimeters. They have been studied in a variety of fields due to their excellent thermal, electrical and physical properties and a high aspect ratio. The inherent characteristics of such carbon nanotubes are attributed to the sp2 bond of carbon. The carbon nanotubes are stronger than iron, lighter than aluminum, and exhibit electrical conductivity similar to that of metals. Carbon nanotubes are classified into a single-wall carbon nanotubes (SWNTs), a double-wall carbon nanotubes (DWNTs) and a multi-wall carbon nanotubes (MWNTs). They are also divided into a zigzag, armchair and chiral structure depending on the asymmetry/chirality.

Most studies to date have focused on dispersions of powdered carbon nanotubes as a reinforcing agent for composites, or the production of transparent conductive films using the dispersions, and have already been commercialized in some fields. In order to use carbon nanotubes in composite materials and transparent conductive films, the dispersion of carbon nanotubes is important. However, it is difficult to disperse them at a high concentration and to maintain dispersibility because of cohesive forces from strong van der Waals force of carbon nanotubes. In addition, in the case of a composite material in which carbon nanotubes are used as a reinforcing material, it is difficult to sufficiently express the excellent properties of carbon nanotubes.

In recent years, there has been much research on fiberizing carbon nanotubes for the production of carbon nanotube structures that sufficiently express the properties of carbon nanotubes.

Coagulation spinning, liquid-crystalline spinning, and direct spinning are typical examples of methods for fiberizing carbon nanotubes using a dispersion solution containing carbon nanotubes and a dispersant.

Coagulation spinning is a method for fiberizing carbon nanotubes in which a dispersing solution containing carbon nanotubes and a dispersant is injected into a polymer solution so that the dispersant in the dispersing solution is transferred into the polymer solution and the sites are filled with the polymer to serve as a binder.

Liquid-crystalline spinning is a method for fiberizing carbon nanotubes using the nature of a carbon nanotube solution to form liquid crystals under specific conditions. This method is advantageous in that it can produce carbon nanotube fibers with good orientation, but has a disadvantage that the spinning speed is very slow and the conditions of forming liquid crystals of carbon nanotubes are strict.

Direct spinning is a method in which carbon nanotubes are synthesized in a heating furnace by injecting a liquid carbon source and a catalyst together with a carrier gas into an upper inlet of a vertically erected high temperature heating furnace, and the aggregates of carbon nanotubes, which go down to bottom of the heating furnace together with the carrier gas, are wound up inside or outside the heating furnace to form fibers.

Although the mechanical strength of carbon nanotubes (CNTs) themselves is very high, especially tensile strength exceeding 100 GPa, synthesized CNTs are limited in application because they are CNTs which are short fibers having a short length. In order to solve this problem, a method of making long CNT fibers by connecting short CNT fibers has been recently studied.

Variables affecting the strength of the CNT fibers may include the length, diameter, and bonding strength between the CNTs. There is also a method of improving the degree of alignment to improve the strength of the CNT fibers.

In order to improve the alignment of carbon nanotube (CNT) fibers, there is a method of increasing the recovery rate at the step of recovering CNT fibers.

There is a method of improving the recovery rate at the step of recovering CNT fiber in order to improve the alignment of carbon nanotube (CNT) fibers. Such a method is, for example, a method of recovering CNT fibers at a high recovery rate of 20 to 50 m/min or more. In this case, although the degree of alignment can be improved, it is difficult to continuously produce the CNT fiber aggregates because the CNT fiber aggregates tend to break at such a high recovery rate.

SUMMARY

An object of the present invention is to provide a method for improving the alignment of carbon nanotube fiber aggregates.

In order to solve the above problems, the present invention provides a method for manufacturing a carbon nanotube fiber aggregate, comprising the steps of:

introducing the carbon nanotube fiber aggregates into a water bath at a constant rate while applying an ultrasonic wave; and recovering the introduced carbon nanotube fiber aggregates at a constant rate of 20 m/min or less.

According to one embodiment, the ultrasonic wave may have a frequency in the range of 1 kHz to 1 MHz.

The ultrasonic wave may be applied for a period of 0.001 to 120 seconds.

According to one embodiment, as the application time of ultrasonic wave increases, a polarized Raman ratio of the carbon nanotube fiber aggregates may increase. The application time may preferably be 0.01 seconds or more, 0.1 seconds or more, 1 second or more and 150 seconds or less, 120 seconds or less, or 60 seconds or less. If the application time exceeds 150 seconds, the fibers may be cut, which is undesirable.

In addition, the polarized Raman ratio may be a ratio ($IG/IG_{\pm}$) of G peak intensities in a longitudinal direction to in a vertical direction of the carbon nanotube fiber aggregates measured at 1600 cm$^{-1}$.

According to one embodiment, the polarized Raman ratio may be 4.1 or more.

According to one embodiment, the carbon nanotube fiber aggregates may be composed of raw materials for spinning in which catalyst precursors are dispersed in liquid or gaseous carbon compound.

According to one embodiment, the method may further include the step of forming carbon nanotubes from the raw materials for spinning and continuously fusing the carbon nanotubes to directly spin the carbon nanotube fibers.

The liquid or gaseous carbon compound may include at least one selected from the group consisting of methane, ethylene, acetylene, methyl acetylene, vinyl acetylene, ethanol, methanol, propanol, acetone, xylene, chloroform, ethyl acetic acid, diethyl ether, polyethylene glycol, ethyl formate, mesitylene, tetrahydrofuran (THF), dimethylformamide (DMF), dichloromethane, hexane, benzene, carbon tetrachloride and pentane.

The catalyst precursor may include at least one selected from the group consisting of iron, nickel, cobalt, platinum, ruthenium, molybdenum, vanadium and oxides thereof.

In addition, the catalyst precursor may be in a metallocene form.

According to another embodiment of the present invention, carbon nanotube fiber aggregates having a polarized Raman ratio of 4.1 or more produced by the above-described method, can be provided.

Other specific embodiments of the present invention are included in the following detailed description.

According to a method for manufacturing a carbon nanotube fiber aggregate according to the present invention, the alignment of the carbon nanotubes constituting the carbon nanotube fiber aggregate can be improved by applying ultrasonic waves to the carbon nanotube fiber aggregate, and therefore a carbon nanotube fiber aggregate having excellent physical properties can be obtained. The carbon nanotube fiber aggregates produced by the method according to the present invention are expected to be applied to various fields such as a reinforcing material for a multifunctional composite material, a strain and damage detector using a stable repetitive piezoresistive effect, a transmission line using high conductivity, electrochemical devices having a high specific surface area, excellent mechanical properties and electrical conductivity, for example, microelectrode materials for sensing biomaterials, supercapacitors, and actuators.

BRIEF DESCRIPTION OF THE DRAWINGS

FIG. 1 is a schematic view illustrating a method for aligning carbon nanotube fibers according to the present invention.

FIG. 2 is a graph showing the relationship between an application time of ultrasonic wave and a polarized Raman ratio.

FIG. 3 is a graph showing break strengths according to the Examples and Comparative Examples.

DETAILED DESCRIPTION

The present invention is capable of various modifications and various embodiments, and particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description, well-known functions or constructions are not described in detail if it is determined that they may obscure the gist of the present invention.

The term "aggregate" as used herein may be described interchangeably with "agglomerate" and may be understood to mean a collection of singular objects.

The term "introducing" as used herein may be described interchangeably with "inflow", "injection" herein, and may be understood to mean flowing or putting liquid, gas or heat, etc. into the places in a need thereof.

The term "carbon nanotube fibers" in the present specification refers to both carbon nanotubes grown in a fiber form and a plurality of carbon nanotubes fused together in a fiber form.

Hereinafter, a method for manufacturing a carbon nanotube fiber aggregate according to an embodiment of the present invention will be described in detail.

The present invention relates to a method for manufacturing a carbon nanotube fiber aggregate with improved alignment, comprising the steps of:

passing carbon nanotube fiber aggregates through a water bath to which ultrasonic waves are applied; and recovering the introduced carbon nanotube fiber aggregates at a predetermined rate of 20 m/min or less.

Conventionally, in order to improve the alignment of the carbon nanotubes constituting the carbon nanotube fiber aggregate, the recovery step is carried out at a high recovery rate of 20 m/min or more. However, at such a high speed, there is a problem in that the carbon nanotubes are liable to be broken. In order to solve this problem, according to the present invention the recovery step is performed at a constant rate of 20 m/min or less. For example, the recovery step may be performed at 15 m/min or less or 12 m/min or less. The recovery speed may be 1 m/min or more or 5 m/min or more.

According to one embodiment, the ultrasonic waves to be applied to the carbon nanotube fiber aggregates may have a frequency range of 1 kHz to 1 MHz, for example, 10 kHz to 100 kHz, for example, 30 kHz to 50 kHz. If the frequency range is too low, the alignment of the carbon nanotubes may be degraded, and if the frequency range is excessively high, the carbon nanotube fiber aggregates may be decomposed.

According to one embodiment, the polarized Raman ratio of the carbon nanotube fiber aggregates can be increased by increasing the time of applying ultrasonic waves to the carbon nanotube fiber aggregates. The application time of ultrasonic wave may be, for example, 0.001 to 120 seconds, for example 0.01 to 60 seconds, for example 0.1 to 30 seconds. If the application time of the ultrasonic wave is too short, the carbon nanotubes may not be sufficiently aligned. If the application time of the ultrasonic wave is too long, the efficiency may be lowered in improving the alignment of the carbon nanotubes. The application time of the ultrasonic wave may be suitably selected by those skilled in the art depending on the state of the carbon nanotube fiber aggregate, and the environment, such as the type of catalyst.

The polarized Raman ratio is a measure for evaluating the degree of alignment of the CNTs constituting the CNT fiber aggregate. In the Raman spectrum analysis, the polarized Raman ratio may be a ratio ($IG/IG_{\pm}$) of the maximum intensities of G peaks in a longitudinal direction to a vertical direction of the carbon nanotube fiber aggregates, in the range from 1560 $cm^{-1}$ or more to 1600 $cm^{-1}$ or less. In addition, the value of the polarized Raman ratio according to the present invention may be 4.1 or more, 10.0 or less, and may have a value of 4.3 to 5.0, for example.

According to one embodiment, the carbon nanotube fiber aggregates used in the present invention may be composed of raw materials for spinning in which catalyst precursors are dispersed in a liquid or gaseous carbon compound.

According to one embodiment, the carbon nanotube fiber aggregates may be produced by the method comprising the step of forming carbon nanotubes from the raw materials for spinning and continuously fusing the carbon nanotubes to directly spin the carbon nanotube fibers.

The liquid or gaseous carbon compound is a carbon source, which is diffused into the catalyst and can be synthesized into carbon nanotubes. It can be chosen in consideration of molecular weight distribution, concentration, viscosity, surface tension, dielectric constant and properties of the solvent used. The liquid or gaseous carbon compound may comprise, for example, at least one selected from the group consisting of methane, ethylene, acetylene, methyl acetylene, vinyl acetylene, ethanol, methanol, propanol, acetone, xylene, chloroform, ethyl acetic acid, diethyl ether, polyethylene glycol, ethyl formate, mesitylene, tetrahydrofuran (THF), dimethylformamide (DMF), dichloromethane, hexane, benzene, carbon tetrachloride, and pentane.

In addition, the catalyst precursor may be a substance that is not itself included in the catalytic cycle but can be converted to an active catalyst (or produces an active catalyst) in the system of the catalytic reaction. CNTs can be synthesized after the catalyst precursor forms a catalyst. The catalyst precursor may include, for example, at least one selected from the group consisting of iron, nickel, cobalt, platinum, ruthenium, molybdenum, vanadium and oxides thereof. The catalyst may be in the form of nanoparticles and may be in a metallocene form such as ferrocene, which is a compound containing, for example, iron, nickel, cobalt, etc., but is not particularly limited thereto.

According to one embodiment, the present invention can be achieved by a process of directly spinning carbon nanotube fibers or ribbons from carbon nanotubes formed immediately after introducing of a raw material in a reactor by using chemical deposition (CD).

Direct spinning is a process of synthesizing carbon nanotubes in a heating furnace by injecting a raw material for spinning in which a catalyst is added to a carbon source, together with a carrier gas into a vertical furnace at a constant rate, and fusing them to continuously produce carbon nanotube fibers which are composed only of carbon nanotubes.

The reaction zone of the high-temperature furnace is a zone in which a carbon source forms carbon nanotubes by a graphitization catalyst and at the same time forms a continuous aggregate. When the raw material for spinning is reacted in the reaction zone, carbon nanotubes are synthesized, and the synthesized carbon nanotubes grow or fuse together to be continuously aggregated, and thus a cylindrical carbon nanotube fiber aggregate can be formed.

The raw material for spinning containing a carbon source may be carbonized and graphitized while flowing from the upper end to the lower end of the heating furnace or from the lower end to the upper end of the heating furnace to form carbon nanotube fibers composed of continuous aggregates or sock of carbon nanotubes.

The raw material for spinning may be prepared by dispersing a catalyst or a catalyst precursor in a carbon compound. The catalyst or the catalyst precursor may be mixed in an amount of 0.5 to 10 wt %, 1 to 5 wt %, or 1.5 to 4 wt % based on the carbon compound. If an excess catalyst or catalyst precursor is used in comparison with the carbon source, the catalyst may act as an impurity, which makes it difficult to obtain high-purity carbon nanotube fibers, and rather it may become a factor that hinders the thermal, electrical, and physical properties of the carbon nanotube fibers.

In the present invention, the raw material for spinning may further comprise a catalytic activator. Generally, carbon nanotubes are synthesized by diffusion of carbon into the catalyst in the molten state of the catalyst, followed by precipitation of the carbon nanotubes. The catalyst activator is used as a promoter in the synthesis of carbon nanotubes to increase a diffusion rate of carbon, thereby allowing carbon nanotubes to be synthesized in a short time.

As the catalytic activator, for example, elemental sulfur and a sulfur-containing compound can be used. Specific examples thereof include sulfur-containing aliphatic compounds such as methylthiol, methylethylsulfide, dimethylthioketone and the like; sulfur-containing aromatic compounds such as phenylthiol, diphenylsulfide and the like; sulfur-containing heterocyclic compounds such as pyridine, quinoline, benzothiophene, thiophene and the like; elemental sulfur, preferably sulfur or thiophene, and more preferably sulfur. Sulfur reduces the melting point of the catalyst and removes the amorphous carbon, allowing synthesis of high purity carbon nanotubes at low temperature.

According to a preferred embodiment of the present invention, the catalyst precursor and the catalytic activator may be in a liquid phase for the liquid carbon compound, and may be in a gas phase for the gaseous carbon compound. Therefore, for the liquid carbon compound, a catalyst precursor or a catalytic activator can be injected by dissolving it, and for the gaseous carbon compound a catalyst precursor or a catalytic activator can be injected by vaporizing it.

In the present invention, the carbon compound may be in a liquid phase or a gas phase, and it may be diffused into the catalyst to synthesize carbon nanotubes. It can be chosen in consideration of molecular weight distribution, concentration, viscosity, surface tension, dielectric constant and properties of the solvent used.

The carbon nanotube fiber aggregates can be produced by spinning a raw material for spinning containing a carbon source in the presence of a carrier gas containing a reducing gas.

According to one embodiment, the carrier gas comprises a reducing gas, and the reducing gas may be a hydrogen gas, ammonia gas, or a combination thereof.

The carrier gas may further comprise an inert gas. The inert gas may include a gas containing nitrogen, helium, neon, argon, krypton, xenon, radon or a mixture thereof. Since the inert gas is chemically stable and has a property of not exchanging electrons or sharing them, it can serve to allow carbon nanotubes to flow and move, by inflow of the gas without reacting with carbon nanotubes (CNTs).

In the present invention, the feed rate of the raw material supplied to the reaction zone may be 10 to 500 ml/min, preferably 50 to 200 ml/min or 80 to 150 ml/min.

Further, the flow rate of the carrier gas injected into the reaction zone, for example, in the case of hydrogen gas of the flow rate may be 1 to 5 L/min or 1.5 to 3 L/min.

According to another embodiment, the carrier gas may be injected at a linear velocity of 1 to 5 cm/sec, preferably at a linear velocity of 1.5 to 3 cm/sec or 1.8 to 2.5 cm/sec. The linear velocity of the carrier gas to be injected may vary depending on the kind of the carrier gas, the size of the reactor, the type of the catalyst, and the like.

According to a preferred embodiment, the carbon nanotube fibers can be prepared by direct spinning, in which the carbon nanotube fibers or ribbons are spun directly from the carbon nanotubes formed by chemical vapor deposition. The direct spinning is carried out by adding a catalyst to a carbon source and injecting it into a vertical furnace together with a carrier gas to synthesize the carbon nanotubes in the furnace, and by fusing them to continuously produce carbon nanotube fibers composed only of carbon nanotubes.

The reaction zone of the high-temperature furnace is a zone in which a carbon source forms carbon nanotubes by a graphitization catalyst and at the same time forms a continuous aggregate. When the raw material for spinning is reacted in the reaction zone, carbon nanotubes are synthesized, and the synthesized carbon nanotubes grow or fuse together to be continuously aggregated, and thus a cylindrical carbon nanotube fiber aggregate can be formed. The carbon nanotube fibers thus formed can be wound using a winding means. The winding speed may affect the orientation of the carbon nanotubes in the fibers in the fiber axis direction and may be a factor for determining the thermal, electrical, and physical properties of the carbon nanotube fibers. For example, the winding speed may range from 5 to 100 rpm.

The temperature of the reaction zone may be 1,000 to 3000° C. Preferably it may be 1,000 to 2,000° C., 1,000 to 1,500° C., or 1,000 to 1,300° C., and more preferably 1,150 to 1,250° C. If it is less than 1000° C., carbon nanotube fibers may not be formed. If the temperature is more than 3000° C., carbon nanotubes may be vaporized. Therefore, the above range is preferable.

In the present invention, there may be provided carbon nanotube fiber aggregates having improved degree of alignment, for example, a polarized Raman ratio value of 4.1 or more, by ultrasonic treatment before winding the carbon nanotube fibers, and by controlling the winding speed.

Hereinafter, embodiments of the present invention will be described in detail so that those skilled in the art can easily carry out the present invention. The present invention may, however, be embodied in many different forms and should not be construed as limited to the embodiments set forth herein.

Examples 1 to 4: Synthesis of Carbon Nanotube Fiber Aggregates

A ferrocene catalyst precursor and a sulfur catalyst activator were vaporized and introduced into a cylindrical reactor at a rate of 0.5 g/hr and 0.135 g/hr, respectively. Methane as a carbon compound and carrier gas (hydrogen) were flowed into the upper end of the cylindrical reactor at a temperature of 1200° C. at a rate of 115 to 152.5 ml/min and 1.8 to 2.2 L/min, respectively. Carbon nanotube fibers discharged through the output at the lower end of the reactor were passed through a water bath to which ultrasonic waves were applied under the condition of 1.5 W/cm$^2$ and 40 kHz. Then, they were wound by a bobbin winder at a recovery rate of 10 m/min to recover carbon nanotube fiber aggregates. The passing time through the water bath to which ultrasonic waves were applied was 4 seconds (Example 1), 12 seconds (Example 2), 60 seconds (Example 3), and 120 seconds (Example 4), respectively. A schematic diagram of the process is shown in FIG. 1.

Comparative Examples 1 to 3

In Comparative Example 1, the carbon nanotube aggregates were neither passed through a water bath nor subjected to ultrasonic waves. In Comparative Example 2, the carbon nanotube aggregates were passed through the water bath without applying ultrasonic waves.

In Comparative Example 3, the ultrasonic waves were applied for 12 seconds without passing through the water tank.

Experimental Example: Evaluation of the Alignment of the Carbon Nanotubes

In order to evaluate the degree of alignment of the carbon nanotubes constituting the carbon nanotube fiber aggregates according to the Examples, the polarized Raman ratio ($IG/IG_\perp$) according to the application time of the ultrasonic wave was measured. The results are shown in Table 1 and FIG. 2.

TABLE 1

|  | Application time of ultrasonic wave | $IG/IG_\perp$ |
|---|---|---|
| Comparative Example 1 (pristine) | 0 | 3.97 |
| Comparative Example 2 | 0 (water bath only) | 4.02 |
| Comparative Example 3 | 12 (without water bath) | 3.98 |
| Example 1 | 4 | 4.31 |
| Example 2 | 12 | 4.92 |
| Example 3 | 60 | 4.94 |
| Example 4 | 120 | 4.82 |

As can be seen from the above results, it was found that as the application time of the ultrasonic wave became longer, the polarized Raman ratio ($IG/IG_\perp$) increased and the alignment degree of the carbon nanotubes constituting the carbon nanotube fiber aggregates was improved. When the application time of ultrasonic wave was longer than 60 seconds, the polarized Raman ratio was decreased. If the ultrasonic waves were applied for more than 150 seconds, the fibers were broken, and therefore the experiment could not be carried out.

Test Example 1: Evaluation of the Physical Properties of the Carbon Nanotube Fiber Aggregates The breaking strength was measured using a FAVIMAT+ instrument from Textechno, the load cell with a range of 210 cN and the gauge length of 2.0 cm, and the experiment was conducted at a speed of 2 mm/min.

The results of the measurement of the breaking strength are shown in Table 2 below.

TABLE 2

|  | Application time of ultrasonic wave | Average breaking strength |
|---|---|---|
| Comparative Example 1 | 0 | 2.65 |
| Comparative Example 2 | 0 (water bath only) | 2.89 |
| Comparative Example 3 | 12 (without water bath) | 2.68 |
| Example 2 | 12 | 5.62 |

As shown in Table 2, it can be seen that the carbon nanotube fibers according to the present invention are significantly improved in breaking strength as compared with the pristine carbon nanotube fibers of Comparative Example 1 or the carbon nanotube fibers of Comparative Examples 2 and 3. A Comparison of the breaking strengths of Comparative Examples 1 and 2 and Example 2 are shown in FIG. 3. According to the present invention, it can be seen that the breaking strength of the fibers is increased when the carbon nanotube fibers are passed through a water bath with the application of the ultrasonic wave, compared to the case in which only the water bath treatment is conducted or the case in which only the ultrasonic wave is applied without the water bath treatment.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A method for manufacturing a carbon nanotube fiber aggregate, comprising the steps of:
    forming carbon nanotubes from raw materials and continuously fusing the carbon nanotubes to directly spin a carbon nanotube fiber aggregate;
    introducing the carbon nanotube fiber aggregate to a water bath to which ultrasonic waves are applied; and
    recovering the introduced carbon nanotube fiber aggregate at a rate of 20 m/min or less.

2. The method for manufacturing the carbon nanotube fiber aggregate according to claim 1, wherein the ultrasonic waves have a frequency of 1 kHz to 1 MHz.

3. The method for manufacturing the carbon nanotube fiber aggregate according to claim 1, wherein the ultrasonic waves are applied for a period of 0.001 to 120 seconds.

4. The method for manufacturing the carbon nanotube fiber aggregate according to claim 1, wherein a polarized Raman ratio is a ratio ($IG/IG_\perp$) of G peak intensities in a longitudinal direction to a vertical direction of the carbon nanotube fiber aggregates is 1560 $cm^{-1}$ or more and 1600 $cm^{-1}$ or less.

5. The method for manufacturing the carbon nanotube fiber aggregate according to claim 4, wherein the polarized Raman ratio is 4.1 or more and 10 or less.

6. The method for manufacturing the carbon nanotube fiber aggregate according to claim 1, wherein the raw materials for spinning comprises catalyst precursor dispersed in a liquid or gaseous carbon compound.

7. The method for manufacturing the carbon nanotube fiber aggregate according to claim 6, wherein the liquid or gaseous carbon compound comprises at least one selected from the group consisting of methane, ethylene, acetylene, methyl acetylene, vinyl acetylene, ethanol, methanol, propanol, acetone, xylene, chloroform, ethyl acetic acid, diethyl ether, polyethylene glycol, ethyl formate, mesitylene, tetrahydrofuran (THF), dimethylformamide (DMF), dichloromethane, hexane, benzene, carbon tetrachloride and pentane.

8. The method for manufacturing the carbon nanotube fiber aggregate according to claim 6, wherein the catalyst precursor comprises at least one selected from the group consisting of iron, nickel, cobalt, platinum, ruthenium, molybdenum, vanadium and oxides thereof.

9. The method for manufacturing the carbon nanotube fiber aggregate according to claim 6, wherein the catalyst precursor is in a metallocene form.

* * * * *

UNITED STATES PATENT AND TRADEMARK OFFICE
CERTIFICATE OF CORRECTION

| | |
|---|---|
| PATENT NO. | : 11,549,202 B2 |
| APPLICATION NO. | : 16/340887 |
| DATED | : January 10, 2023 |
| INVENTOR(S) | : Eugene Oh et al. |

It is certified that error appears in the above-identified patent and that said Letters Patent is hereby corrected as shown below:

On the Title Page

(73) Assignee should read: LG Chem, Ltd., Seoul (KR)
          Postech Academy-Industry Foundation, Gyeongsangbuk-Do (KR)

Signed and Sealed this
Second Day of April, 2024

*Katherine Kelly Vidal*

Katherine Kelly Vidal
*Director of the United States Patent and Trademark Office*